United States Patent [19]

Warrink et al.

[11] Patent Number: 4,720,062
[45] Date of Patent: Jan. 19, 1988

[54] AILERON FOR AN AIRPLANE WING

[75] Inventors: Berned J. J. Warrink, Rijsenhout; Ed Obert, Nieuw-Vennep, both of Netherlands

[73] Assignee: Fokker B. V., Schiphol, Netherlands

[21] Appl. No.: 842,532

[22] Filed: Mar. 21, 1986

[30] Foreign Application Priority Data

Mar. 29, 1985 [NL] Netherlands ............... 8500950

[51] Int. Cl.⁴ .............................. B64C 9/30
[52] U.S. Cl. .................................. 244/90 R
[58] Field of Search ............ 244/45 R, 90 R, 199, 244/91

[56] References Cited

U.S. PATENT DOCUMENTS 2,191,842 2/1940 Back ........................ 244/90 R
4,044,971 8/1977 Pharris ..................... 244/90 R

FOREIGN PATENT DOCUMENTS 723258 6/1942 Fed. Rep. of Germany ...... 244/199
95109 7/1960 Netherlands ................. 244/199
221986 9/1924 United Kingdom ............ 244/90 R Primary Examiner—Galen Barefoot
Attorney, Agent, or Firm—Handal & Morofsky

[57] ABSTRACT

Aileron for an airplane wing controlled by a reversible control system. The aileron comprises a first section extending generally behind the pivot axis of the aileron parallel to the longitudinal axis of the wing and a second section extending in front of the pivot axis of the wing to aerodynamically balance the aileron. The second section is coinciding with the wing tip. To improve the transversal stability of the airplane during drifting flight the second section is directed upwards and outwards with respect to the chord plane of the wing at an angle between 20° and 70° with the chord plane.

5 Claims, 5 Drawing Figures

AILERON FOR AN AIRPLANE WING

The invention relates to an aileron for an airplane wing controlled by a reversible control system. The aileron comprises a first section extending in general behind the pivot axis of the aileron parallel to the longitudinal axis of the wing and a second section extending in front of the pivot axis of the wing to aerodynamically the aileron. The second section coincides with the wing tip.

One of the design requirements of an airplane can be that the airplane exhibits an acceptable degree of lateral stability. A positive transversal stability means that the wing at the weather side has a tendency to go upward if the relative wing direction is not parallel to the longitudinal axis of the plane but at an angle with it. Such a flight situation can originate in case where the airplane, because of a disturbance, receives a roll angle resulting in movement the in sidewards direction under the influence of the gravity component. This behaviour of the airplane is indicated by the term slip. A natural tendency to correct such a roll angle may be obtained where, looking at the airplane in front view, both wing halves extend upward from the hull and outward, in other words, where both wing halves are positioned at a dihedral angle. A dihedral creates an incident angle difference between both wing halves during drifting flight, resulting in a restoring moment in relation to the longitudinal axis of the plane. If the pilot tries to counteract the restoring movement to maintain drifting flight, then he has to increase aileron angle and exert a rudder force as if a roll manoeuvre to the wind has to be carried out.

More information in relation to the necessity of a sufficient lateral stability can e.g. be found in NACA Report 927, "Appreciation and prediction of flying qualities", W. H. Philips, 1949 and in the book "Dynamics of Flight, Stability and Control" by B. Etkin, especially page 235 a.ff.

Specific flight conditions can exist in which the lateral stability of the airplane with the rudder in the neutral position is too small. The stability can be increased by choosing e.g. a larger dihedral configuration. However, where increasing the dihedral angle of the plane meets objections because of other design criteria, then it may be possible to enlarge only the dihedral configuration of the wing tips, in other words to use upstanding wing tips. Such upstanding wing tips are e.g. described in NACA Report 548, "Effect of Tip Shape and Dihedral on Lateral-Stability Characteristics", by J. A. Shortel, 1936. Where these known upstanding wing tips are applied the aileron does not extend completely to the wing tip but ends approximately at the transition between the upstanding wing tip and the remaining section of the wing. In that case the aileron does not have a horn balance element. Examples of airplanes with a construction of this type are: Gulfstream Aerospace Commander Jetprop 100 and Aerospatiale TB30 Epsilon. For further details reference is made to The New Observer's Book of Aircraft" by W. Green, 1984.

As is already indicated in the introductory part the aileron may comprise a first section extending in general behind the pivot axis of the aileron parallel to the longitudinal axis of the wing and a second section extending in front of the pivot axis and coinciding with the wing tip. The second section is called the horn balance element. The horn balance element can keep variations in the rudder power for changing the flight conditions small. If the aileron is in the neutral position the horn balance element does not extend outside the contour of the wing tip. At the frontside of the horn balance element, however, not connected to the horn balance element, the front part of the wing tip construction may extend in the form of a so called nose fairing for protecting the horn balance element against the sedimentation of ice and bird collisions. The presence of this nose fairing, however, is in relation to the invention not of essential importance. Horn balance elements are often applied and it appears that for a wing with dihedral configuration the contribution thereof to the aileron-pivot moment is either not or is hardly influenced by the slip angle. An example of an airplane with a conventional horn balance element is the De Havilland of Canada DHC-7. Further reference is made to The New Observer's Book of Aircrafts by W. Green, 1984.

The object of the invention is now to provide an aileron with a horn balance such that a certain feature of the horn balance element can be made useful for the improvement of the lateral stability with neutral rudder. Of specific interest are aircraft in which the aileron forms part of a so-called reversible control system. A reversible control system is a system by means of which the aileron deflections are made through a direct mechanical connection, for instance by means of cables, controlled by the pilot using the rudder, whereas on the other hand movements of the aileron as result of e.g. a varying incident airstream angle of the wing are directly noticeable for the pilot, not influencing the rudder, by a corresponding movement of the rudder.

The shape of the horn balance element according to the invention resembles the above indicated additional dihedral configuration of the wing tip, but the small influence thereof on the lateral stability of the airplane is not the main object of the invection.

The invention specifically relates to an aileron of the type indicated above, where in agreement with the object of the invention to improve the transversal stability of the airplane during slipping flight the second section is directed upward and outward in relation to the chord plane of the wing at an angle between 20° and 70° with the chord plane. Because of the shape there is an inclined air flow to the horn balance element during slipping flight, creating an air load effecting a downwards movement of the aileron at the weather side and an upwards movement of the aileron at the lee side in case the pilot leaves the rudder by itself or, if the pilot holds the rudder, because of the elasticity in the control system itself. Therefore the wing at the weather side will go upwards and the behaviour of the airplane is similar to the behaviour of an airplane which is not provided with horn balance elements of this type but has a wing with a far larger dihedral configuration.

Measurable improvements in relation to the conventional horn balance elements are obtained with a dihedral configuration between 20° and 70°, and an optimum improvement is obtained with an angle of approximately 45°.

Although it is, within the scope of the invention, possible to position both the indicated second section (the actual horn balance element) and also the part of the first section directly behind the second section in dihedral configuration, it is preferred that the transition between the second section and the part of the first section directly behind the second section is aerodynamically shaped in such a way that the aimed function of the second section is impaired as less as possible.

The invention will now be explained in more detail with reference to the accompanying drawings.

Figure 3:
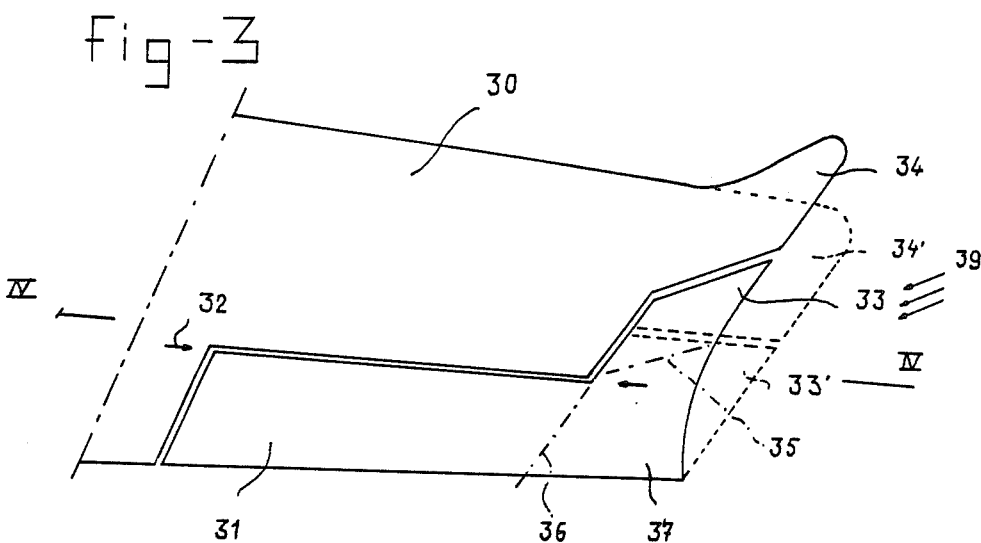
FIG. 3 illustrates schematically an aileron with horn balance element according to the invention.
Figure 4A:
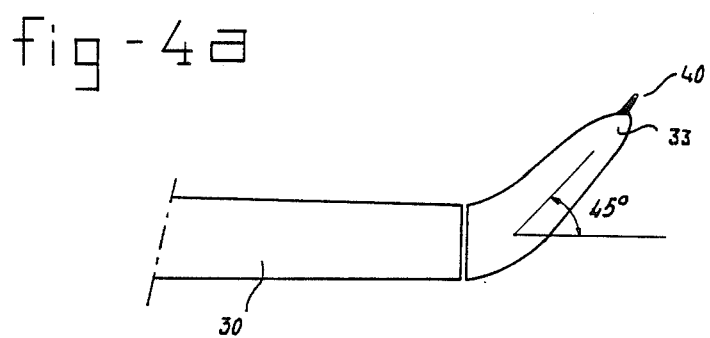

FIGS. 4a and b illustrate two cross-sectional views through the wing of FIG. 3 in the longitudinal direction of the wing through the upstanding horn balance element.

Figure 1:
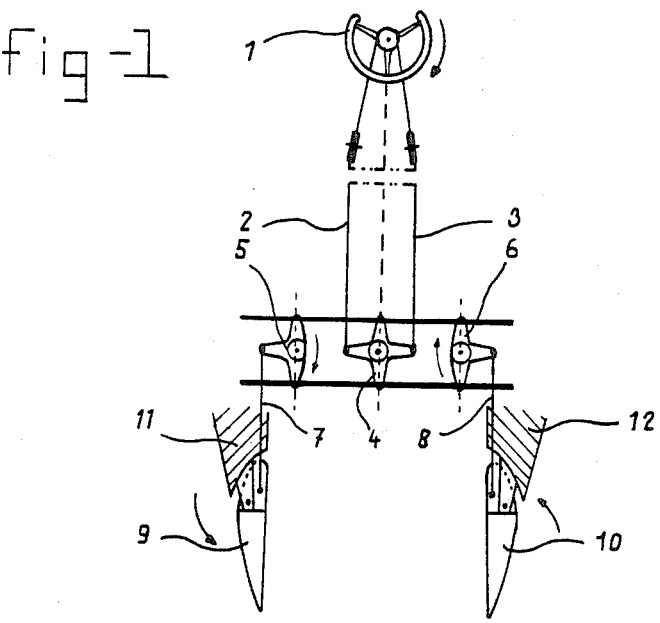
FIG. 1 illustrates schematically a prior art embodiment of a reversible control system.

FIG. 1 illustrates an example of a prior art reversible control system comprising a rudder 1, drawing cables 2 and 3 connected to the shaft of said rudder and with their other end connected to a rotatable cross 4. The rotatable cross 4 is in a not illustrated manner mechanically coupled to the rotatable crosses 5 and 6, from which cables 7 respectively 8 are extending to the schematically indicated ailerons 9 and 10 at the backside of the partly schematically indicated wings 11 and 12. Because said construction is completely known the function thereof will not be discussed in detail. It is only remarked, that reversible control systems of this type show a certain elasticity.

Figure 2:
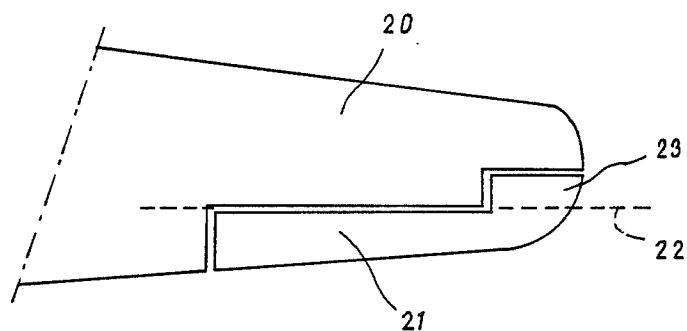
FIG. 2 illustrates a part of a wing with an aileron comprising a horn balance element.

FIG. 2 illustrates a prior art embodiment of an aileron with horn balance element. The end of the wing 20, visible in the Figure, comprises an aileron 21 which is pivotable around a schematically indicated pivot shaft 22. The aileron 21 is near the wing tip pivotable around a schematically indicated pivot shaft 22. The aileron 21 is near the wing tip provided with a section 23 extending, viewed in the flight direction, in front of the pivot shaft 22 and destined for aerodynamically balancing the aileron. By applying said horn balance element the rudder control forces to the aileron are significantly decreased. Such ailerons with horn balance element are also known and therefore a further discussion thereof is superfluous.

FIG. 3 illustrates an embodiment of an aileron according to the invention. The part of the wing 30, which is visible in the Figure. comprises an aileron 31 which in relation to the wing 30 is pivotable around a schematically indicated pivot shaft 32. The aileron comprises a horn balance 33 which, as is illustrated in the Figure, extends under an angle upwards and outwards in relation to the chord plane of the wing 30. Viewed in the flight direction in front of the horn balance element 33 there is a preferably also oblique positioned wing section 34, a so-called nose fairing, functioning for protecting the horn balance element 33 especially against ice sedimentation and bird collisions. Said nose fairing 34 is, however, within the scope of the invention, not necessary.

At the right side in FIG. 3 it is indicated by means of dashed lines how the wing would look in this view in case the flat embodiment illustrated in FIG. 2 was applied. In that case the nose fairing 34' would extend in the same plane as the remaining part of the wing 30 and the same applies to the horn balance element 33'.

The actual horn balance is the section of the aileron 31 which is, viewed in the flight direction, present in front of the pivot axis 32. Said section is in FIG. 3 delimited by the dash-dot-line 35. The part 37 of the aileron 31, present between the dash-dot-lines 35 and 36, forms in the illustrated embodiment a transitional part for realising a smooth transition between the inclined upwards extending horn balance element 33 and the remaining section of the aileron 31, extending in the plane of the wing 30.

Within the scope of the invention the transitional part 37 may be shaped in various ways. It is, however, preferred to select the shapes such that said transitional part 37 has as less possible influence onto the desired effect of the horn balance element.

In the Figure the relative air flow direction of the air is indicated by means of arrows 39.

FIG. 4 illustrates schematically sectional views through the wing of FIG. 3 according to the line IV—IV in FIG. 3. As is indicated in FIG. 4a the upstanding horn balance element 33 is preferably extending under an angle of plusminus 45° in relation to the chord plane of the wing 30. Furthermore in FIG. 4a it is schematically indicated that eventually a thin extending profile 40 can be attached to the edge of the horn balance element 33, said extending profile 40 making an angle with the chord plane of the wing 30, which angle does not necessarily have to be equal to the angle of the horn balance element itself. The task of said further profile 40 is to increase the influence of the balance element as a whole on the lateral stability of the airplane during drifting flight.

Figure 4B:
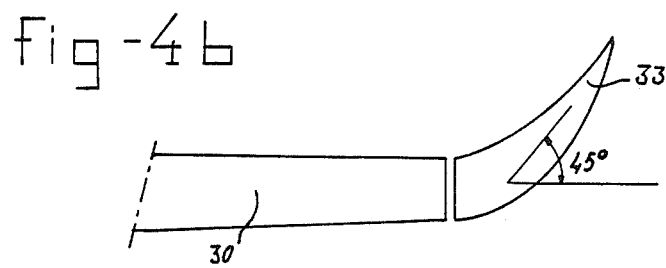

FIG. 4b illustrates an alternative embodiment of FIG. 4a. In said embodiment the tip edge 33 of the second section of the horn balance element is itself given a sharp shape.

What is claimed is:

1. Aileron for an airplane wing controlled by a reversible control system, said aileron comprising a first section extending in general behind the pivot axis of the aileron parallel to the longitudinal axis of the wing and a second section extending in front of the pivot axis of the wing for aerodynamically balancing the aileron, said second section coinciding with the wing tip, wherein to improve the transveral stability of the airplane during drifting flight the second section is directed upwards and outwards in relation to the chord plane of the wing at an angle between 20° and 70° with said chord plane.

2. Aileron according to claim 1, wherein the angle with said chord plane is approximately 45°.

3. Aileron according to claim 1 wherein the transition between the second section and that part of the first section directly behind the second section is smoothly configured such that said part has a minimum disadvantageous influence on the aimed effect of the second section.

4. Aileron according to claim 1, wherein to improve the aerodynamic behaviour the second section comprises an upstanding edge on or near the wing tip, the dimension of said edge in the longitudinal direction of the wing being small in relation to the dimension of the second section.

5. Aileron according to claim 1, wherein to improve the aerodynamic behaviour the second section comprises a sharp tip edge.

* * * * *